H. E. WHITE.
SPREADING MACHINE FOR EXPANDED SHEET METAL.
APPLICATION FILED SEPT. 9, 1915.
1,198,685.
Patented Sept. 19, 1916.
8 SHEETS—SHEET 2.
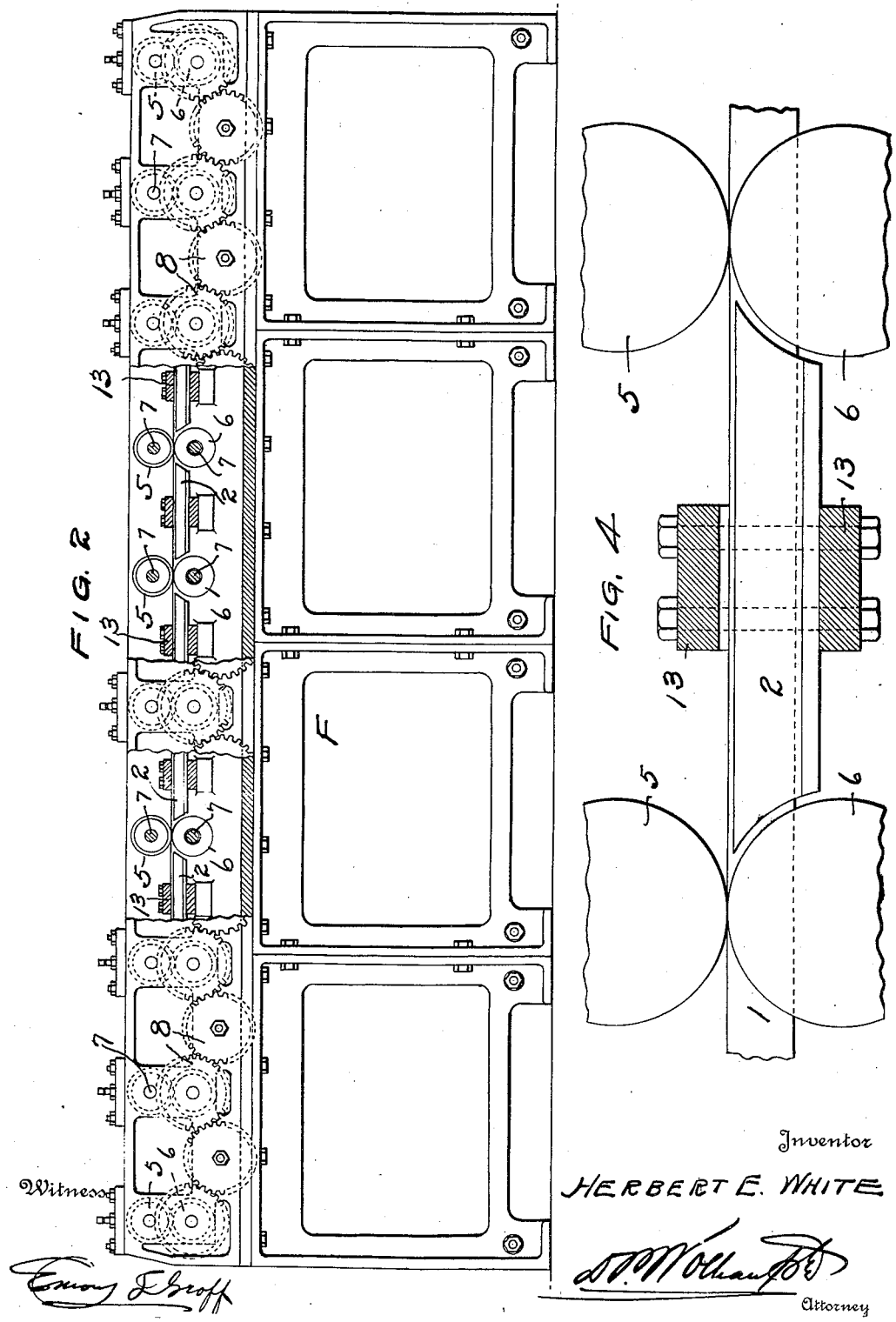
Inventor
HERBERT E. WHITE

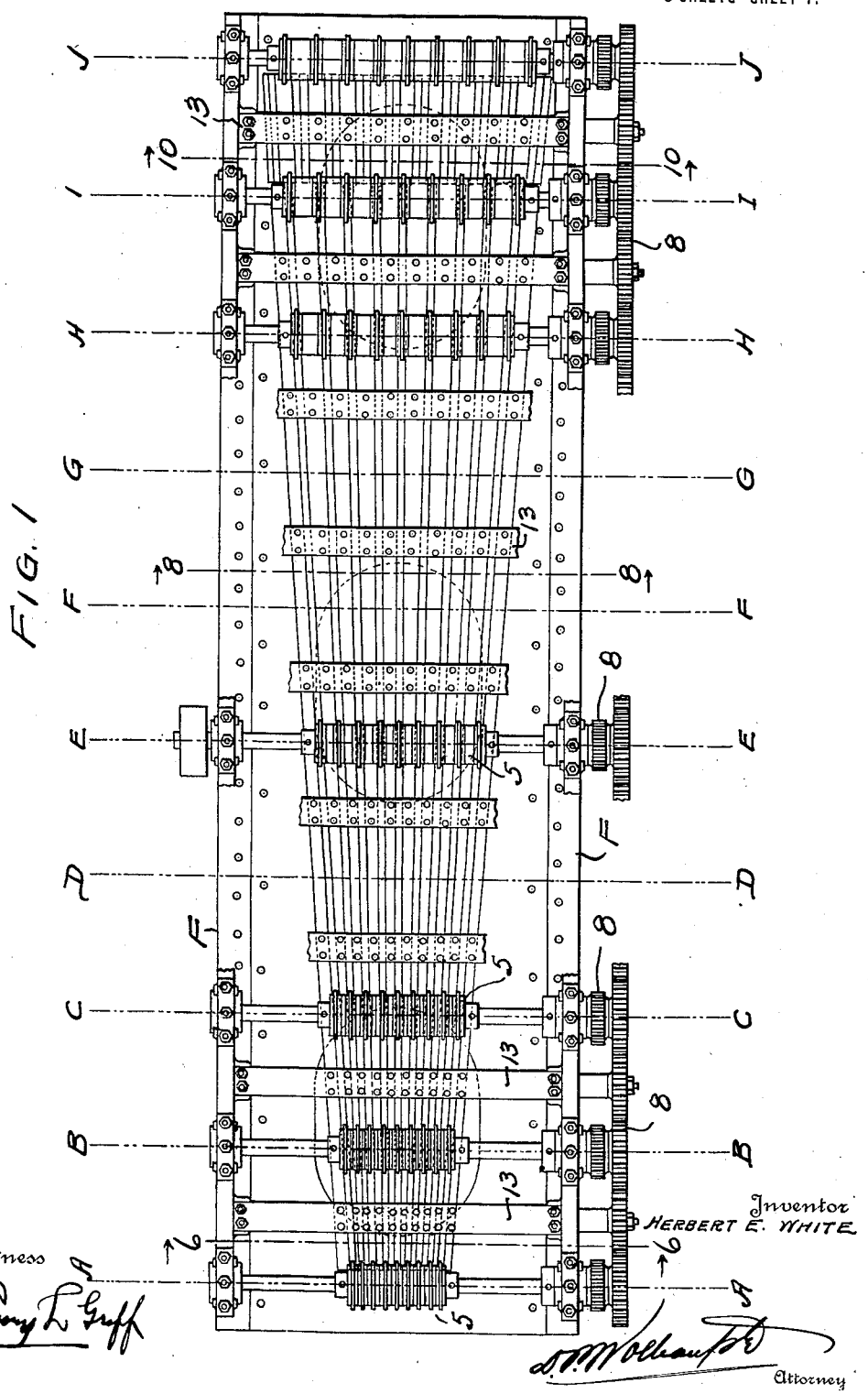

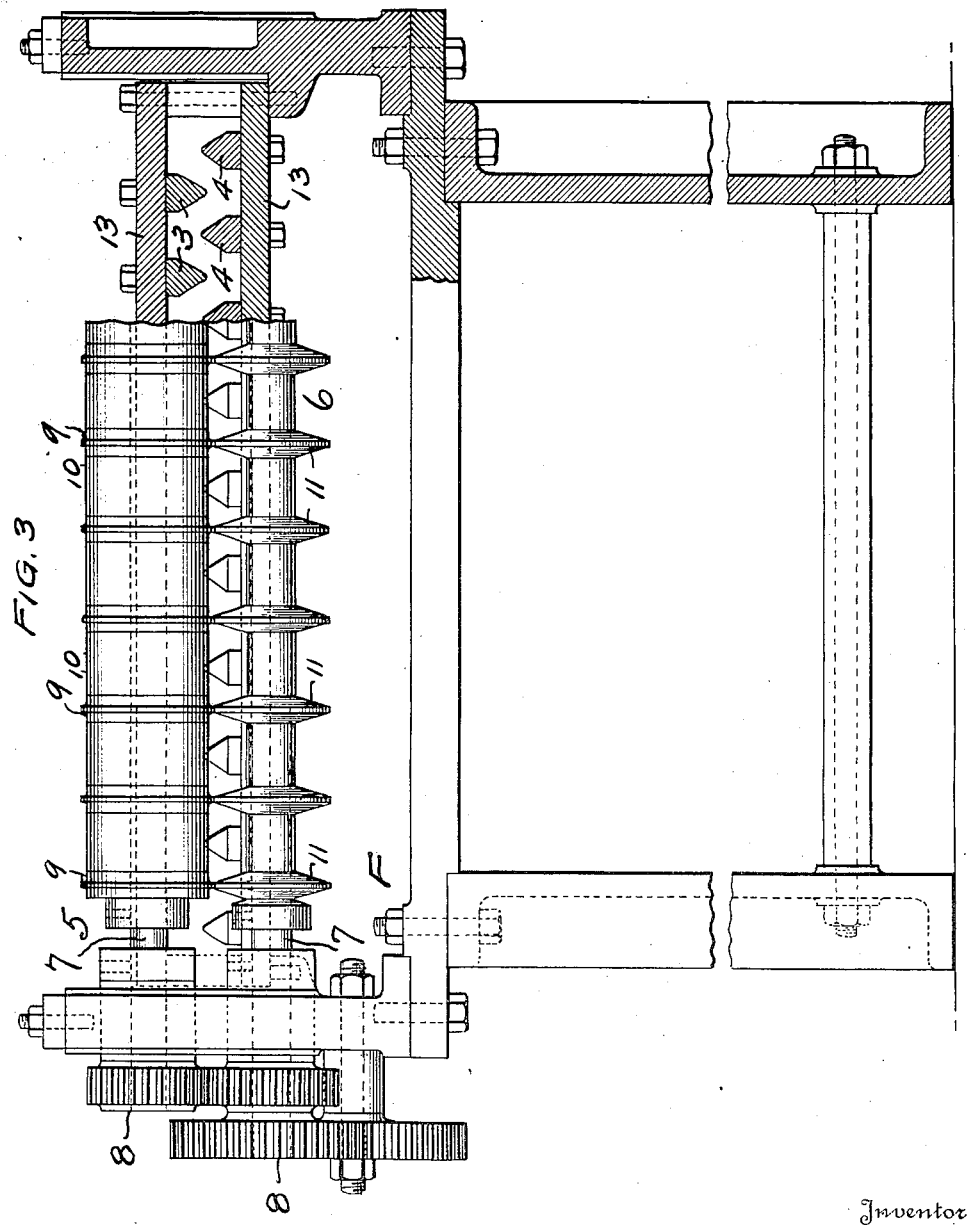

H. E. WHITE.
SPREADING MACHINE FOR EXPANDED SHEET METAL.
APPLICATION FILED SEPT. 9, 1915.
1,198,685.
Patented Sept. 19, 1916.
8 SHEETS—SHEET 4.
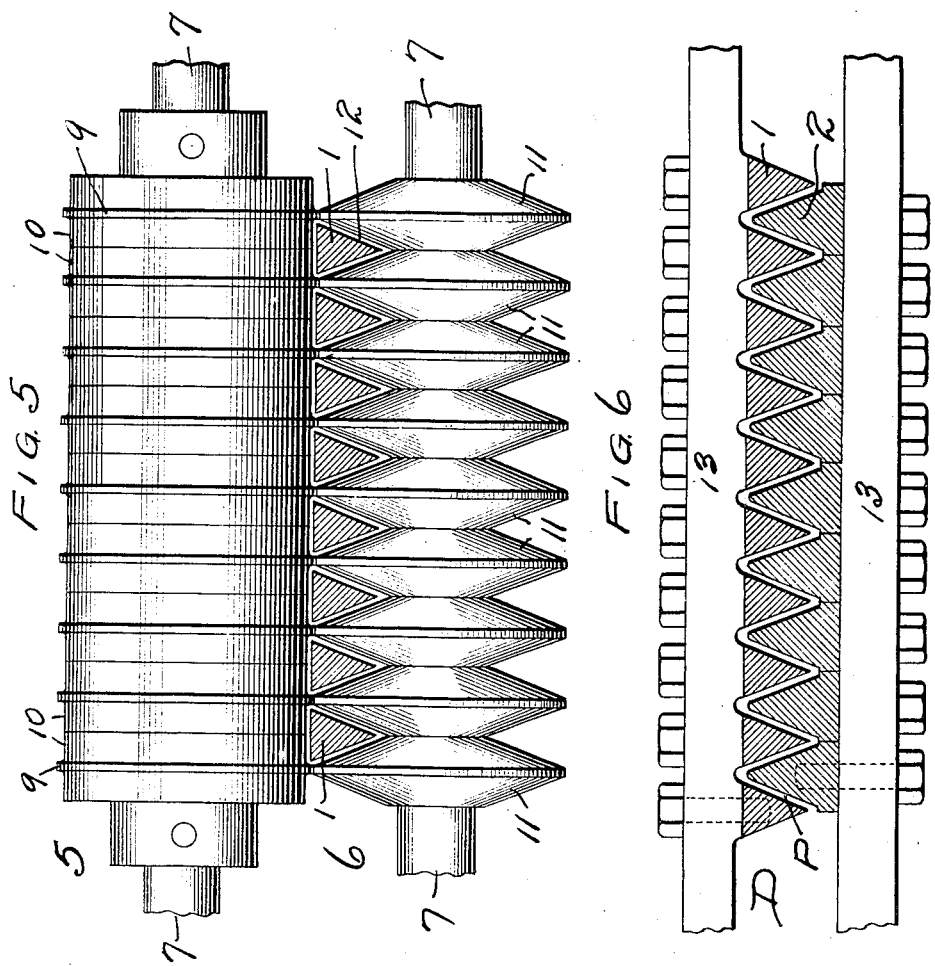

H. E. WHITE.
SPREADING MACHINE FOR EXPANDED SHEET METAL.
APPLICATION FILED SEPT. 9, 1915.
1,198,685.
Patented Sept. 19, 1916.
8 SHEETS—SHEET 5.
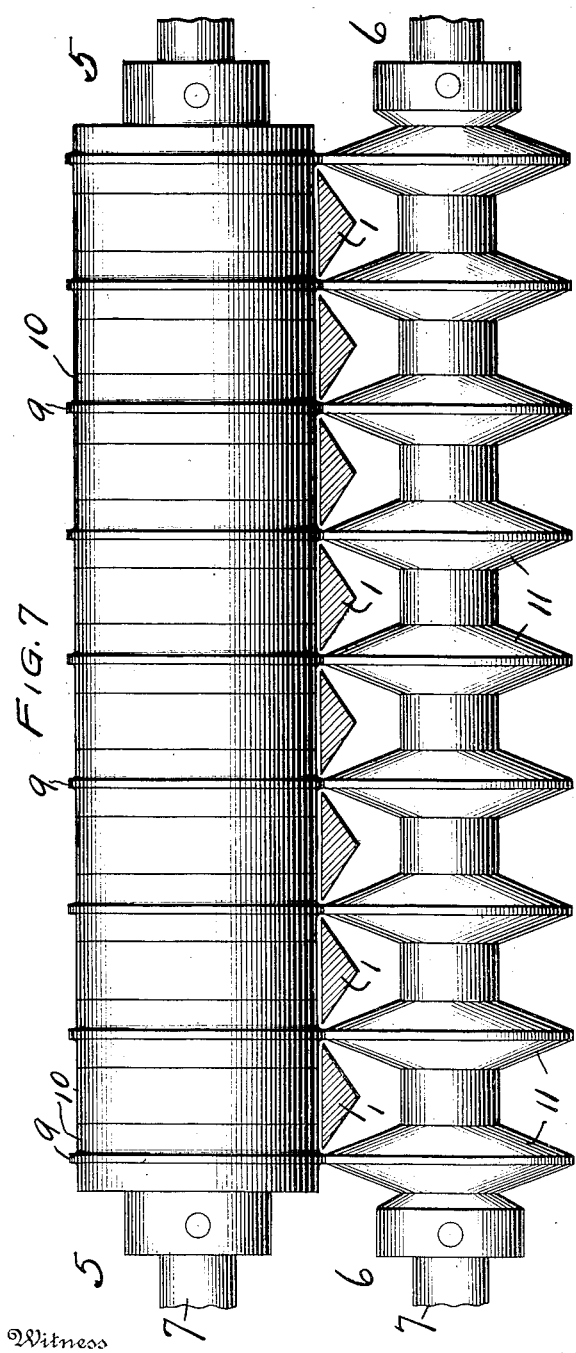
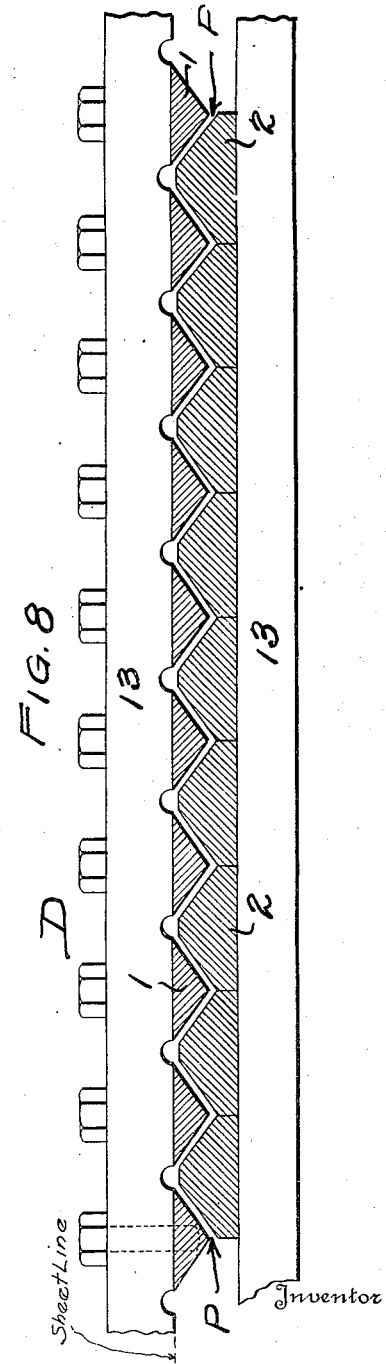
Witness
Herbert E. White
By
Attorney H. E. WHITE.
SPREADING MACHINE FOR EXPANDED SHEET METAL.
APPLICATION FILED SEPT. 9, 1915.
1,198,685.
Patented Sept. 19, 1916.
8 SHEETS—SHEET 6.
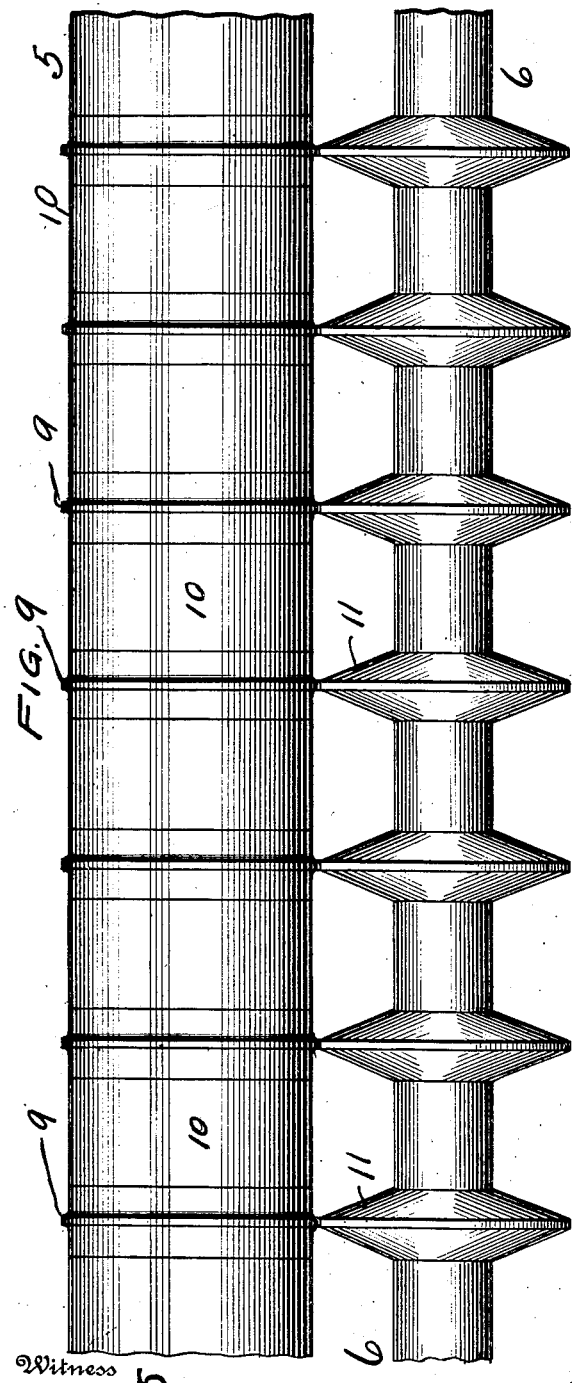
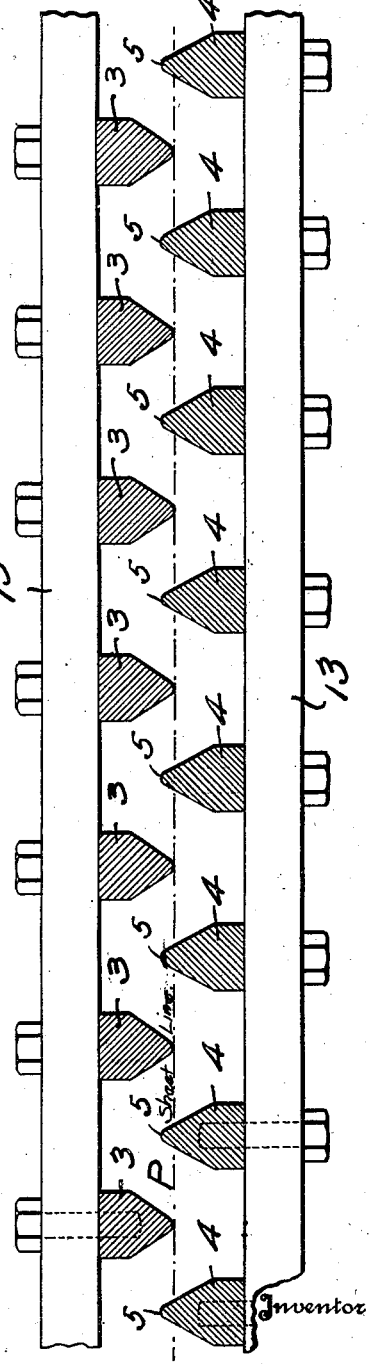

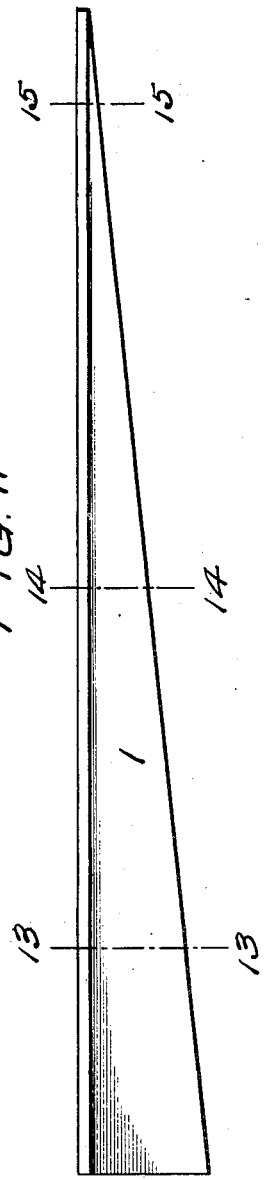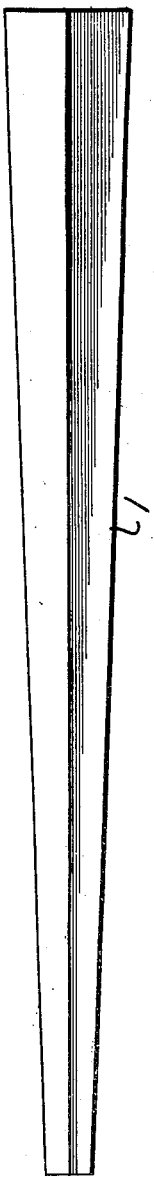

H. E. WHITE.
SPREADING MACHINE FOR EXPANDED SHEET METAL.
APPLICATION FILED SEPT. 9, 1915.

1,198,685.

Patented Sept. 19, 1916.
8 SHEETS—SHEET 8.

Inventor
HERBERT E. WHITE

Witness

By

Attorney

UNITED STATES PATENT OFFICE.

HERBERT E. WHITE, OF YOUNGSTOWN, OHIO.

SPREADING-MACHINE FOR EXPANDED SHEET METAL.

1,198,685. Specification of Letters Patent. Patented Sept. 19, 1916.

Application filed September 9, 1915. Serial No. 49,756.

*To all whom it may concern:*

Be it known that I, HERBERT E. WHITE, a citizen of the United States, residing at Youngstown, in the county of Mahoning and State of Ohio, have invented certain new and useful Improvements in Spreading-Machines for Expanded Sheet Metal, of which the following is a specification.

This invention relates to machinery for manufacturing expanded sheet metal products, and more particularly to an improved machine having means for rapidly and properly spreading a previously slitted and expanded sheet to its final width and form.

The invention primarily has in view a machine for spreading or laterally expanding a troughed expanded fabric to develop the same into an expanded sheet metal product of the diamond mesh type, and to that end contemplates improved means for performing that operation in a practical and commercial manner without injury to the material.

With these and other objects in view which will be apparent to those skilled in this art, the invention consists in the novel construction, combination, and arrangement of parts hereinafter more fully described, illustrated, and claimed.

The essential features of the invention involved in the novel construction and arrangement of the stationary spreader die and the plurality of traction-units combined therewith are necessarily susceptible of a wide range of structural modification without departing from the spirit or scope of the invention. However, a practical form of machine which embodies the invention is shown in the accompanying drawings, in which—

Figure 16:
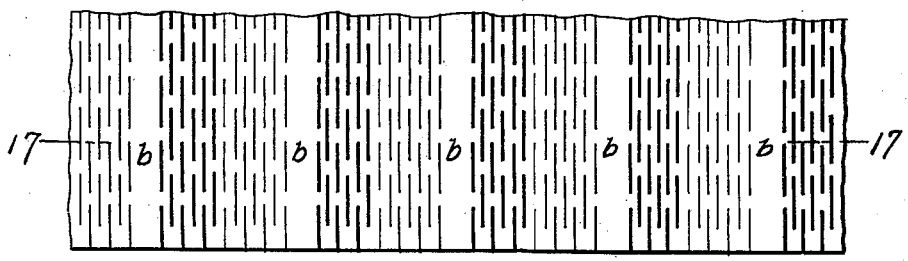
Figure 17:
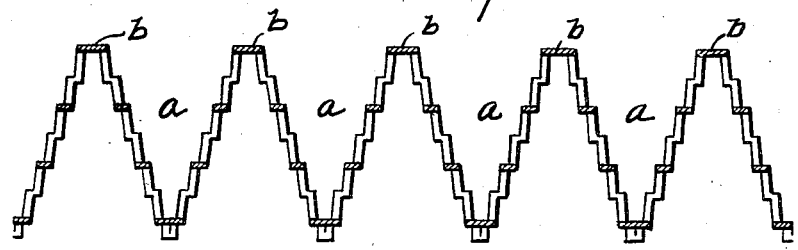
Figure 18:
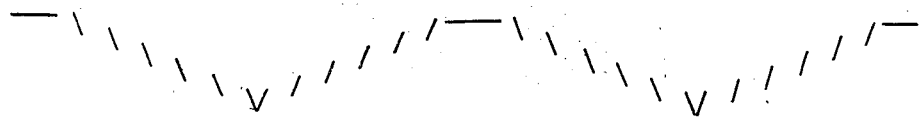
Figure 19:
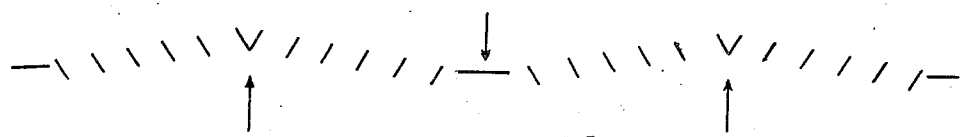
Figure 20:

Figure 1 is a top plan view of the improved machine, indicating by dotted lines the location of a number of the traction-units which are employed for propelling the sheet through the machine. Fig. 2 is a side elevation partly in section, to expose the arrangement of the traction-unit rolls, particularly with reference to the sections of the lower guide bars which are interrupted by the lower tractor disks of the traction units. Fig. 3 is an end view of the machine, the view being partly in section to expose a sheet straightening unit which is interposed between the last two traction-units at the delivery end of the machine. Fig. 4 is an enlarged detail view illustrating more clearly the relation, longitudinally, of the upper and lower guide bars, to the tractor disks of the traction-units. Fig. 5 is an enlarged detail view of the first unit or set of traction rolls, showing in section the upper guide bars which lie in the clearance passes or spaces thereof. Fig. 6 is a cross sectional view of the stationary spreader die at the point indicated by the line 6—6 on Fig. 1, this location being between the first and second sets of traction rolls. Fig. 7 is a view similar to Fig. 5 of a set of the traction rolls at an intermediate location designated by the line F. Fig. 8 is a cross sectional view of the spreader die indicated by the line 8—8 on Fig. 1, this location being between two intermediate sets of traction rolls. Fig. 9 is an elevation of the delivery set of traction rolls occupying the location designated by the line J on Fig. 1 of the drawings. Fig. 10 is a cross sectional view on the line 10—10 of Fig. 1 illustrating the delivery section of the spreader die which may also function as a sheet straightening unit before the product emerges from the machine. Fig. 11 is an elevation of one of the upper guide bars of the spreader die. Fig. 12 is a bottom plan view of one of the upper guide bars. Figs. 13, 14 and 15 are cross sectional views on the lines 13—13, 14—14, and 15—15 of Fig. 11. Fig. 16 is a plan view of a section of the expanded troughed material which is operated upon by the present machine. Fig. 17 is a cross sectional view thereof on the line 17—17 of Fig. 16. Figs 18 and 19 are diagrammatic views illustrating the shape assumed by the material as it is flattened or ironed out by the action of the stationary spreader die; Fig. 19 also illustrating by the arrows the straightening pressure exerted by the guides of the sheet-straightening unit. Fig. 20 is a sectional view of a reverse type of diamond mesh lath as finished by the present machine.

Similar reference characters designate corresponding parts throughout the several figures of the drawings.

The machine of the present invention is designed to develop a troughed expanded sheet metal product to its final width and form, and also preferably to impart thereto its final set. The general physical characteristics of this troughed expanded shape are illustrated in Figs. 16 and 17 of the drawings, and while the product here shown may be produced up to this point in any suitable manner, an apparatus available for the purpose is disclosed in my former Patent No. 1,049,632, dated Jan. 7, 1913. The details of the process incident to the production of the troughed metal shape are fully explained in that patent, so for the purposes of the present invention it need only be noted that this shape of material results from subjecting contiguous longitudinal inside areas of the metal blank simultaneously to a slitting and stretching operation. This operation has the effect of deforming the said areas into a plurality of approximately V-shaped troughed expanded sections, designated by the letter $a$ in Fig. 17 of the drawings. And, the troughed expanded material that is developed to finished form in the passes of the present machine is preferably formed with uncut or unslitted stiffening strips $b$, extending lengthwise of the fabric and substantially flat and straight throughout. These strips afford substantial engaging surfaces for the traction elements of the machine as will presently appear, and while such strips are illustrated as being uncut or unslitted, and also as being flat and straight throughout, it will of course be understood that this is not an essential detail as far as the present invention is understood, because such strips may be grooved or ungrooved if desired, or may or may not be slitted. However, in any form of construction the lengthwise strips $b$ are utilized for traction or feeding purposes, as above referred to.

To provide for spreading the troughed expanded material in order to straighten the troughed expanded sections $a$ into substantially the flat plane of the sheet, the present invention includes in its organization what is herein termed a stationary spreader die, designated in Fig. 6 of the drawings generally by the reference letter D. This spreader die is arranged longitudinally throughout the machine, which also includes a suitable machine or frame stand F within the upper part of which is arranged the working parts of the machine.

The stationary spreader die functions to spread the troughed expanded material to its final width, while at the same time forcing the troughed sections back into substantially the original or flat plane of the sheet. Structurally, the said spreader die fundamentally consists of a transverse series of upper and lower guide bars 1 and 2 respectively, which are arranged in alternating registering relation. These guide bars are spaced a sufficient distance apart to provide therebetween a sinuous die pass P corresponding to the troughed or sinuous formation of the troughed expanded material, and through this die pass the said material is forcibly advanced or propelled.

At the receiving end of the machine, the sinuous die pass is much narrower in width and deeper vertically than at the delivery end where the sinuous characteristic of the pass is obliterated, and the finished sheet emerges through practically a straight horizontal slot. In other words, the said die pass progressively becomes flatter or shallower in vertical depth, and wider transversely of the machine, in a direction toward the discharging or delivery end of the machine. This is provided for by the form of the guide bars and their disposition within the machine. In the embodiment shown, the said guide bars are preferably of substantially V-shape in cross section and are graduated in thickness and width. This is best shown in the group of Figs. 11 to 15 inclusive, showing one of the upper guide bars. This guide bar is designated by the reference numeral 1 and is of a double beveled or V-shape in cross section and tapers toward one end both laterally and vertically, so as to adapt itself to the constantly diminishing angle of the troughs of the material as the latter is moved through the machine.

A further feature of the stationary spreader die which is essential to the successful operation of the machine is to arrange the upper and lower guide bars divergently from the receiving to the delivery end of the machine, thereby providing means whereby the troughed expanded material will be given a gradual fan-like movement until substantially its final width is reached. In this connection, it will be observed by comparison of Figs. 6, 8 and 10 of the drawings, (representing the die pass at the receiving end, at an intermediate location, and at the delivery end of the machine), that the expanded troughs in the material are compelled to straighten out gradually and evenly, and if desired, the delivery section of the spreader die shown in Fig. 10 of the drawings may also be utilized as a sheet straightening unit. To that end, the guide bars in the said delivery section of the spreader die are preferably arranged in widely spaced staggered relation. These bars, in said delivery section, are designated by the reference numerals 3 and 4 respectively, and are formed with bearing tips 5 having a slight projection beyond the line or plane of the sheet, as indicated in Fig. 10 of the drawings. By reason of this arrangement, the edges or tips of the upper and lower combined guiding and bearing bars 3 and 4 will have a deflecting or bearing down engagement with the central portions of the expanded sections between the strips or ribs $b$ of the material. This will operate to strain such portions from the plane they occupy when leaving the main section of the spreader unit, to positions slightly beyond the normal plane (see arrows $x$ in Fig. 19). Accordingly, when the said expanded sections are released from the pressure of the bars 3 and 4, they will spring back and resume a substantially flat plane, thus leaving the product in the final position shown in Fig. 20 of the drawings.

In order to positively propel or advance the expanded material through the machine, the same includes a series of traction units which are repeated at various intervals throughout the length of the machine, and the locations of these units are designated generally in the drawings by the lines A, B, C, D, E, F, G, H, I, and J. These units are of substantially the same construction and only differ as to their progressive and graduated relation. Each of the same consists of a pair of superposed contacting rolls 5 and 6, arranged one upon the other, and mounted on mandrels or shafts 7 which are journaled in suitable bearings on the machine frame or stand, and are positively driven by means of suitable drive gearing designated generally by the reference number 8.

The two rolls 5 and 6 of each traction-unit are so arranged as to have a firm tractional engagement with the longitudinal strips $b$ of the expanded material, and to provide for this, the upper roll 5 includes a plurality of tractor elements or disks 9 having plain flat guiding collars 10 between them, while the lower traction roll 6 preferably consists of a plurality of tractor disks 11 which are double beveled or V-shape in cross section. The peripheral edges of the disks 9 and 11 are paired in opposite relation according to the spacing between the strips $b$ of the fabric propelled thereby, while the double beveled or V-shaped formation of the tractor disks 11 of the lower rolls 6 provide therebetween substantially V-shaped clearance passes 12 within which lie the correspondingly shaped upper guide bars 1 of the stationary spreader die. This construction is very plainly shown in Figs. 5 and 7 of the drawings.

From the foregoing description it will be observed that the upper guide bars 1 of the spreader die may be continuous bars and extend from one end of the machine to the other, through the passes 12 of the traction-unit rolls. But, as shown in Figs. 2 and 4 of the drawings, the lower guide bars 2 must be discontinuous or in sections, so as to be interrupted at and by the lower tractor disks 11 of the traction units. Furthermore, it will be observed that the rolls of the traction units are progressively graduated in harmony with the divergence of the guide bars of the spreader die. That is to say, the spacing between the tractor disks of the successive rolls is progressively increased toward the delivery end of the machine so that the said disks of successive rolls follow the divergence of the guide bars, thereby insuring a positive and strong tractional engagement throughout the machine between the traction-units and the troughed expanded material, the disks of said traction-units maintaining an engagement with the longitudinal strips $b$ of said material at all times during its progress through the machine.

The guide bars of the spreader die may be mounted in any suitable manner within the machine, as for instance by being bolted or otherwise fastened to cross bars or supporting beams 13, but these and other details of construction are unimportant and may be varied at the option of the manufacturer. Also, it will be understood that changes in the form, proportion, and minor details of construction, may be resorted to without departing from the spirit or sacrificing any of the advantages of the invention.

I claim:

1. A spreading machine for troughed expanded metal including a stationary spreader die having a sinuous die pass, which progressively diminishes in depth, and traction units having tractor elements for engagement with the material.

2. A spreading machine for troughed expanded metal including a spreader die having separate die members, and traction units having tractor elements arranged to form a clearance pass for one of the members of the spreader die.

3. A spreading machine for troughed expanded metal including a spreader die having upper and lower die members, and traction units having tractor elements arranged to form a clearance pass to receive an upper member of the spreader die.

4. A spreading machine for troughed expanded metal including a spreader die consisting of upper and lower guide bars arranged in alternating relation to form a die-pass therebetween, and traction-units having tractor elements for engagement with the material.

5. A spreading machine for troughed expanded metal including a spreader die consisting of upper and lower guide bars arranged in alternating relation to form a sinuous die-pass therebetween, and traction-units for engagement with the material.

6. A spreading machine for troughed expanded metal including a spreader die consisting of similar upper and lower guide bars reversely disposed in alternating relation to form a sinuous die-pass therebetween, and traction units having tractor elements for engagement with the material.

7. A spreading machine for troughed expanded metal including a spreader die consisting of upper and lower diverging guide bars arranged to provide a sinuous die-pass therebetween, and traction-units having tractor elements for engagement with the material.

8. A spreading machine for troughed expanded metal including a spreader die consisting of upper and lower cross-sectionally angular diverging guide bars arranged to provide a sinuous die-pass therebetween, and traction-units having tractor elements for engagement with the material.

9. A spreading machine for troughed expanded metal including a spreader die consisting of upper and lower diverging guide bars arranged to provide a sinuous die-pass which progressively diminishes in depth, and traction-units for the material.

10. A spreading machine for troughed expanded metal including a stationary spreader die having a sinuous die-pass which progressively increases in width and progressively diminishes in depth, and traction-units for the material.

11. A spreading machine for troughed expanded metal including a stationary spreader die having a sinuous diverging die-pass which progressively diminishes in depth, and a succession of similar traction-units having progressively spaced tractor elements for engagement with the material.

12. A spreading machine for troughed expanded metal including a stationary spreader die including upper and lower die members and having a sinuous diverging die-pass, and traction-units having tractor elements arranged to form clearance passes through which extend the upper members of said die.

13. A spreading machine for troughed expanded metal including a stationary spreader die, and a series of traction-units each consisting of an upper roll having a plurality of tractor disks with flat guiding collars between them and a lower roll comprising a plurality of tractor disks of double beveled formation to provide clearance passes therebetween.

14. A spreading machine for troughed expanded metal including a stationary spreader die consisting of a series of diverging guide bars, and a series of traction-units each consisting of an upper roll having a plurality of tractor disks with a flat element between them, and a lower roll comprising a plurality of tractor disks of angular formation to provide clearance passes to receive the upper guide bars of the spreader die.

15. A spreading machine for troughed expanded metal including a stationary diverging spreader die having a delivery section provided with sheet straightening means, and tractors for advancing the sheet.

16. A spreading machine for troughed expanded metal including a stationary diverging spreader die, a sheet straightening unit arranged at the delivery end of the machine and comprising a plurality of upper and lower stationary bars arranged in staggered relation and projecting across the sheet line, and feeding means for the sheet.

In testimony whereof I hereunto affix my signature in the presence of two witnesses.

HERBERT E. WHITE.

Witnesses:
    FRANK TURNER,
    O. D. NAISER.